M. W. PRIEL.
ANTISKID DEVICE.
APPLICATION FILED MAR. 14, 1917.
1,253,722.
Patented Jan. 15, 1918.
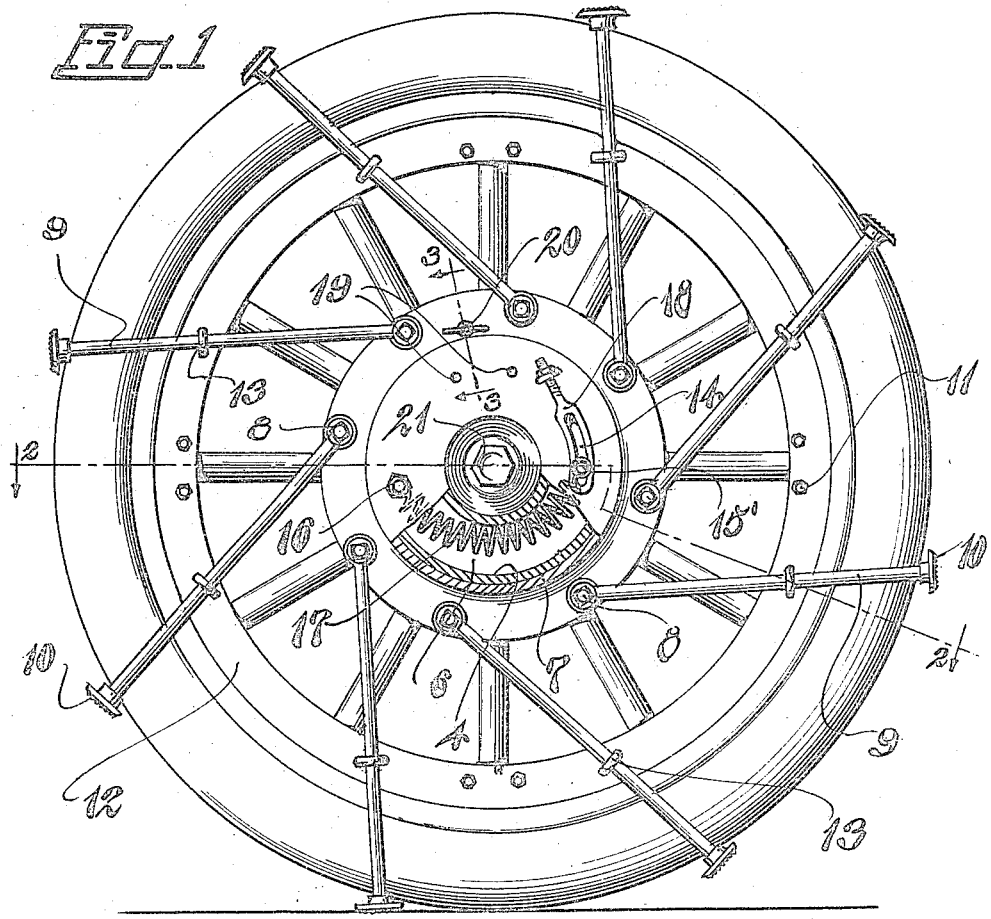
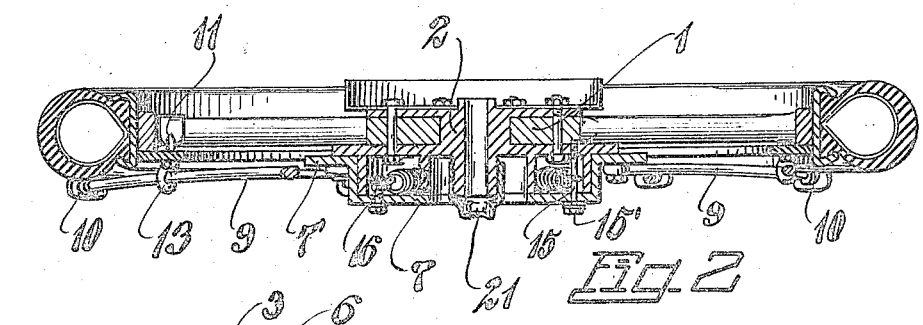
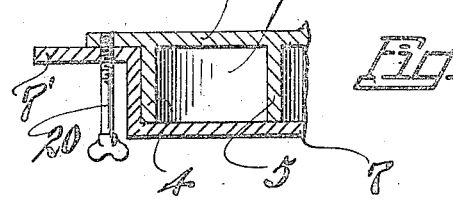
Inventor
Martin W. Priel
By Herbert E. Smith
Attorney

UNITED STATES PATENT OFFICE.

MARTIN W. PRIEL, OF SPOKANE, WASHINGTON.

ANTISKID DEVICE.

1,253,722.   Specification of Letters Patent.   Patented Jan. 15, 1918.

Application filed March 14, 1917.   Serial No. 154,786.

*To all whom it may concern:*

Be it known that I, MARTIN W. PRIEL, a citizen of the United States, residing at Spokane, in the county of Spokane and State of Washington, have invented certain new and useful Improvements in Antiskid Devices, of which the following is a specification.

My invention relates to improvements in anti-skid devices for automobiles, and the object thereof is the provision of a device of this character which is adapted to be applied to the conventional types of auto wheel structures.

A further object resides in the provision of a novel and practical non-skid device which is of comparatively simple construction, inexpensive to manufacture, and thoroughly efficient in operation, being adapted to perform its functions in an exceptionally positive manner.

The apparatus consists broadly, of a central yielding hub mounted member, ground gripping rods pivotally supported thereby, and a spring tensioning means therefor.

The invention further resides in the novel combination, arrangement, and details of the several elements, which will be hereinafter more particularly pointed out in connection with the accompanying drawings in which—

Figure 1 is a side view in elevation of a motor car wheel equipped with my apparatus.

Fig. 2 is a sectional view of the wheel and device taken on the line 2—2 of Fig. 1.

Fig. 3 is an enlarged sectional detail view taken on the line 3—3 of Fig. 1, of a fragment of the central hub structure showing the formation thereof and a locking bolt, the latter being one of the adjuncts included in my improvements.

Referring more specifically to the drawings, in which like characters of reference are used to indicate like parts in the several views, the numeral 1 designates the hub ends or portions of the wheel spokes and 2 a hub structure which is formed in accordance with the requirements of my invention.

In the illustrations, especially Figs. 2 and 3, it will be seen that the annular flanged portion 3 of the hub structure is provided with integral outstanding annular flanges 4 and 5 which are spaced apart as shown to provide an annular chamber 6. Mounted on said hub structure is an annular flanged central member 7 which is adapted to engage and rotate upon the outer flange 4 of the hub structure. Upon the flanged portion 7' of member 7 are pivotally mounted at points 8 a plurality of rods 9 which extend tangentially beyond the wheel tread and are provided with ground gripping feet 10. Secured upon the wheel spokes by means of clips 11 and in contiguous relation to the wheel rim is an annular plate 12 provided with a plurality of outwardly projecting eyes or guides 13 through which the rods 9 extend and are adapted to slide.

The outer flat wall of the member 7 is provided with a slot 14, a threaded bolt 15 screwed into the hub structure projecting therethrough and having a nut 15'. A bolt 16 is fixedly mounted in said wall said bolts being connected by a spiral spring 17 confined within the chamber 6, the spring being adapted to exert considerable retractive tension between the bolts and consequently between the hub structure and the member 7, thereby providing a yielding support for the ground gripping rods 9.

The functions of the several elements may be readily understood. The rods 9 on the rotatable member 7 will be pressed outwardly in the direction of the wheel tire by the action of the spring 17 to maintain the feet 10 somewhat beyond the wheel tread. As the feet come in contact with the ground they will be forced slidably in the direction of their supporting element 7 and against the tension of the spring 17. It is to be noted, Fig. 1, that the rods are so disposed that the feet 10 engage the ground independently of the tire and are therefore not subjected to destructive load strains or stresses.

By means of an adjusting device 18 having a slot registering with the slot 14, movement of the bolt mounted therein may be limited to regulate the extent of outward movement of the ground gripping rods. When it is desired to remove the wheel tire a tool may be inserted in the apertures 19 and the member 7 turned until the rods are sufficiently retracted, that is, within the scope of the wheel rim, and the member then locked in position by means of a winged screw-bolt 20. The hub cap 21 may be independently withdrawn to allow removal of the wheel.

From the foregoing it will be apparent that I have provided an efficient organization for carrying out the objects of my invention; and while I have particularly described elements which are adapted to perform the functions set forth, it is obvious that various changes therein and in minor details of construction may be resorted to, without departing from the spirit and scope of the invention as defined in and by the appended claim.

I claim:—

A non-skid device for vehicle wheels, comprising a flanged and fixed hub member, a flanged member rotatable thereon, an annular plate secured to the spokes of the wheel, guides carried by said plate, ground engaging rods pivotally mounted on the rotatable member and extending tangentially therefrom and beyond the wheel tread and engaged by said guides, a slot in the outer wall of said rotatable member, a bolt extending through the slot and secured to said hub member, a bolt mounted in the outer wall of said rotatable member, a spring connecting said bolts adapted to tension the rotatable member against rotation on said hub member and to maintain said rods in outwardly extended positions.

In testimony whereof, I affix my signature.

MARTIN W. PRIEL.

Copies of this patent may be obtained for five cents each, by addressing the "Commissioner of Patents, Washington, D. C."